3,326,885
CYCLIC HEXAPEPTIDES RELATED TO FERRI-
CHROME AND FERRICHROME A
Vladimir Prelog, Zurich, Switzerland, assignor to Ciba
Corporation, New York, N.Y., a corporation of Delaware
Filed Feb. 13, 1963, Ser. No. 258,260
Claims priority, application Switzerland, Feb. 16, 1962,
1,909/62; Aug. 13, 1962, 9,689/62
18 Claims. (Cl. 260—112.5)

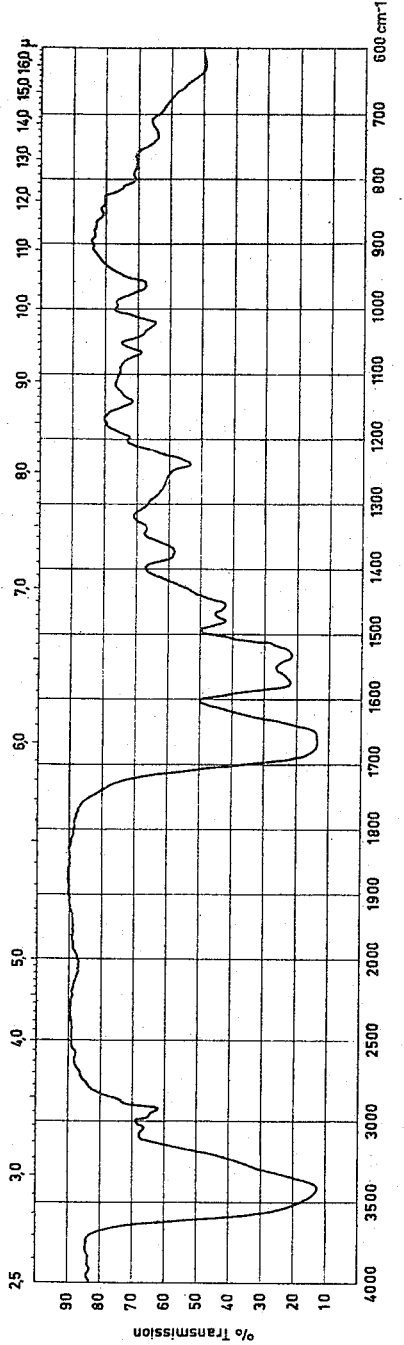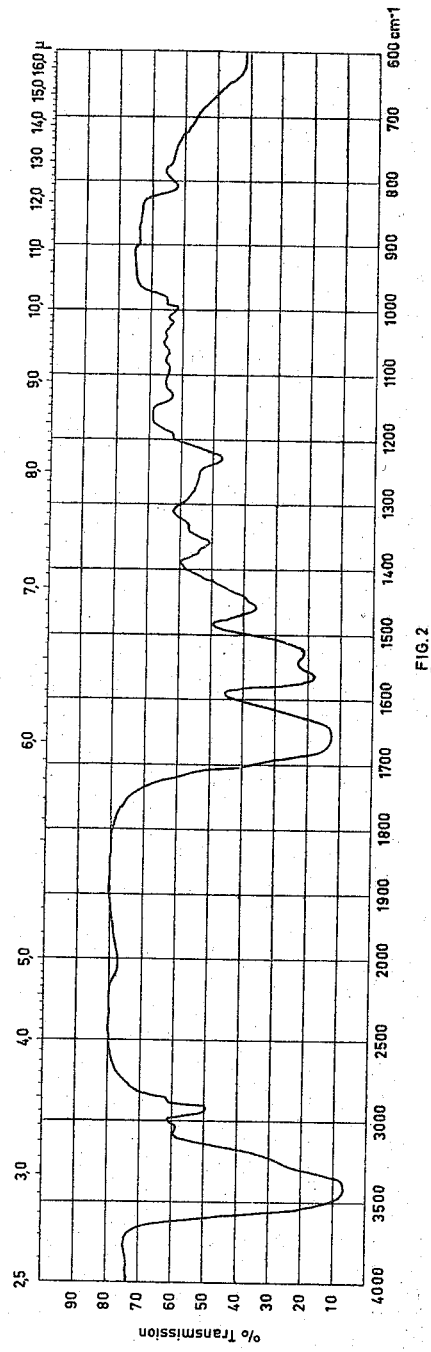

The present invention provides a new process for the manufacture of hydroxylamines, their derivatives and salts. The new hydroxylamines, their derivatives and salts are obtained by eliminating the three acyl groups bound in a hydroxamic acid-like fashion from iron-free ferrichrome or ferrichrome A by selective hydrolysis and, if desired, converting the resulting trihydroxylamine into acid addition salts, or, if desired, N-acylating it and, if desired, manufacturing metal salts of the N-acyl compounds so formed.

In the case of ferrichrome the acyl groups are acetic acid radicals, and in the case of ferrichrome A they are β-methylglutaconic acid radicals.

To acylate the resulting hydroxylamines there are used, for example, aliphatic acyl radicals, more especially alkanoyl or alkenoyl radicals such as formyl, acetyl, propionyl, butyl, valeryl, stearyl or oleyl; also free or functionally modified (for example esterified) succinyl or glutaryl; also aroyl or aralkanoyl radicals, such as unsubstituted or substituted benzoyl, such as salicyl, para-hydroxybenzoyl, para-aminosalicyl, para-methoxybenzoyl, para-ethoxybenzoyl, para-ethoxyethoxy-benzoyl or para-ethoxy-polyethylene-oxy-benzoyl, naphthoyl, free or esterified phthaloyl, carbobenzoxy or phenylacetyl.

Salts are primarily acid addition salts, more especially those with therapeutically acceptable acids, that is to say inorganic or organic acids, for example hydrohalic acids such as hydrochloric or hydrobromic acid; furthermore perchloric, nitric or thiocyanic acid, sulfuric or phosphoric acids; or organic acids such as formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxy-benzoic, 2-acetoxybenzoic, methanesulfonic, ethanesulfonic, hydroxyethanesulfonic, benzenesulfonic, paratoluenesulfonic, naphthalenesulfonic or sulfanilic acid; or methionine, tryptophan, lysine or arginine.

The acyl compounds are of an acidic nature which enables them to form metal salts. Such metal salts are above all those of therapeutically acceptable alkali or alkaline earth metals, such as the salts of sodium, potassium, magnesium or calcium; also those of heavy metals such as cobalt, copper, antimony, and more especially of iron.

Ferrichrome and ferrichrome A are sideramines obtained from cultures of *Ustilago sphaerogena*; they are iron complexes of trihydroxamic acids. The basic skeleton is formed by a cyclic hexapeptide which, in the case of ferrichrome, is made up from three δ-N-hydroxyornithine radicals and three glycine radicals, whereas in the case of ferrichrome A there are present, in addition to three δ-N-hydroxyornithine radicals, two serine radicals and one glycine radical. The hydroxylamine groups of the three δ-N-hydroxyornithine radicals are linked in ferrichrome with three acetic acid radicals and in ferrichrome A with three β-methylglutaconic acid radicals to form hydroxamic acids.

The sequence of the aminoacids in the cyclo-polypeptide ring has not yet been established. A regular alternating sequence of the three hydroxyornithine radicals with the other three aminoacid radicals appears probable. If this is correct, ferrichrome has the Formula Ia, ferrichrome A the Formula Ib

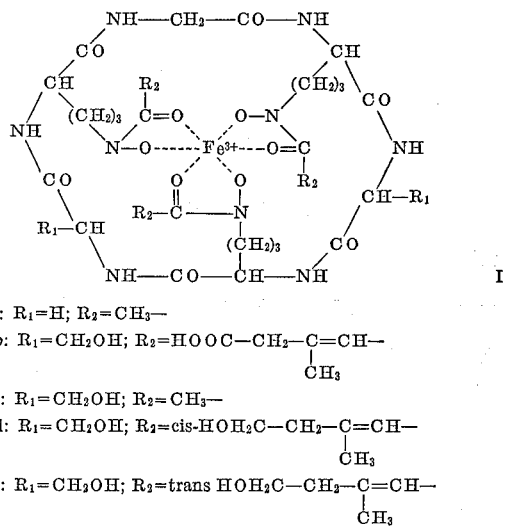

a: $R_1=H$; $R_2=CH_3-$
b: $R_1=CH_2OH$; $R_2=HOOC-CH_2-\underset{CH_3}{\underset{|}{C}}=CH-$
c: $R_1=CH_2OH$; $R_2=CH_3-$
d: $R_1=CH_2OH$; $R_2=$cis-$HOH_2C-CH_2-\underset{CH_3}{\underset{|}{C}}=CH-$
e: $R_1=CH_2OH$; $R_2=$trans $HOH_2C-CH_2-\underset{CH_3}{\underset{|}{C}}=CH-$ The present invention is based on the observation that it is possible to subject the hydroxamic acid bonds in iron-free ferrichrome and ferrichrome A to a selective hydrolysis under conditions such as leave the peptide bonds substantially unaffected. This partial hydrolysis is relatively easy to perform with ferrichrome, whereas the β-methylglutaconic acid radical of ferrichrome A is more difficult to eliminate. The partial hydrolysis is best performed with a dilute mineral acid, for example N-hydrochloric acid. The solutions are heated on a water bath until a drop of the specimen no longer produces a violet coloration on the test plate with ferric chloride solution. In this manner trihydroxylamines are formed, namely, cyclo-[(glycyl)$_3$, (δ-hydroxyornithyl)$_3$] from ferrichrome and cyclo-[(seryl)$_2$, glycyl, (δ-hydroxyornithyl)$_3$] from ferrichrome A.

On reaction of the hydroxylamines with carboxylic acid anhydrides there are primarily obtained tri-(O:N-diacyl)-derivatives having the side chain shown in the partial Formula II

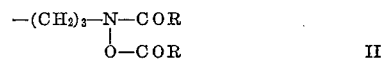

in which —COR represents a carboxylic acid radical. These compounds do not form iron complexes. On the other hand, the O-acyl groups are easy to eliminate partially without affecting the N-acyl group; this can be achieved either with dilute alcoholic potassium hydroxide solution at room temperature, or more advantageously with ammonia is methanol. In this manner, hydroxamic acids are obtained which have the partial Formula III

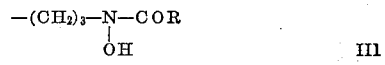

and which on reaction with ferric salts give rise to iron complexes of the type of ferrichrome or ferrichrome A.

For the acylation there are used primarily carboxylic acid anhydrides derived from saturated or unsaturated, straight or branched hydrocarbons having 1–6 carbon atoms. The carboxylic acid anhydrides may have further functional groups, especially hydroxyl or carboxyl groups.

Thus the acylation may be performed particularly with lower alkanoic acid anhydrides such as acetic, propionic, butyric, valeric, acrylic, crotonic, angelic, tiglinic, penten(2)oic, 3-methyl-penten(2)oic, 5 - hydroxy - 3 - methyl-penten(2)oic, or 5-carboxy-3-methyl-penten(2)oic acid anhydrides.

When the trihydroxylamine on which ferrichrome is based is acylated in the described manner with acetic anhydride, then partially hydrolyzed and reacted with ferric ions, the final product is ferrichrome itself. When carboxylic acid anhydrides with a longer chain or used, homologues of ferrichrome may be obtained, for example the propionic acid analogue, or the butyric acid derivative. On the other hand, when the trihydroxylamine, which forms the base of ferrichrome A, is acylated in the manner described above with acetic anhydride, then partially hydrolyzed and iron is introduced into the product, a growth-promoting substance is formed which recently was obtained by cultivating strains of the fungi Aspergillus M 2853 and M 4785 and was given the name ferrichrysin (see U.S. patent application Serial No. 239,193, filed November 21, 1962, by Ernst Gaeumann et al. and now abandoned). In contrast to inactive ferrichrome A this sideramine (Formula Ic) is highly active both in the antagonism test with ferrimycin (see Zahner and co-workers, Arch. Mikrobiol, 36, pages 325 et seq. [1960]) and as growth-promoting factor for *Microbacterium kleinii*. If in the latter case acetic acid is replaced by cis- or trans-5-hydroxy-3-methyl-penten-(2)oic acid two further active growths are obtained, namely, ferrirhodine (Formula Id) or ferrirubin (Formula Ie).

The homologues of the compounds mentioned are likewise highly active growth-promoting substances for numerous microorganisms and may be put to relevant use. They are likewise distinguished by their antagonism towards the antibiotics of the sideromycin group (for example ferrimycin A and grisein).

The corresponding iron-free compounds, owing to their being capable of binding iron, have valuable pharmacological properties. Inter alia, they inhibit the deposition of ferriferous pigments in the tissue, or in cases of pathologic deposition of iron in the organism, they cause the iron to be secreted, for example in haemachromatosis and haemosiderosis. They are, therefore, suitable for use in medicine.

The following examples illustrate the invention:

Example 1

1 gram of 8-hydroxyqinoline in about 10 ml. of methanol is poured into a solution of 1 gram of ferrichrome in 30 ml. of water. The mixture is stirred, whereupon the iron complex of hydroxyquinoline soon begins to settle out as a black precipitate. After about 24 hours the precipitation is complete. The reaction product is filtered through Celite and the filtrate is agitated several times with chloroform to remove the excess reagent. The pale-yellowish solution is then dried under vacuum.

In this manner iron-free ferrichrome is obtained as a substantially white, glassy evaporation radical. The yield is 907 mg., that is to say almost quantitative. In the nuclear magnetic resonance spectrum of this compound (measured in trifluoracetic acid in a Varian Spectrograph, Model A 60), a sharp singlet is found at $\delta=2.54$ parts per million which indicates the presence of N-acetyl groups. The other signals appear as relatively broad bundles at $\delta=2.06$, 4.00, 4.33, 4.52, 4.74 and 8.05 parts per million.

The fact that the product is actually iron-free ferrichrome can be demonstrated by its reformation to crystalline ferrichrome in methanolic solution with ferric chloride in a good yield.

Example 2

A solution of 900 mg. of iron-free ferrichrome in about 70 ml. of N-hydrochloric acid is heated on a water bath maintained at 90° C. Every two minutes a drop is taken from the solution and tested with 1% aqueous ferric chloride solution for a violet color reaction on a staining plate. After 18 minutes this test gives a completely negative result. The solution is evaporated under vacuum. The trihydroxylamine remains as a highly hygroscopic white powder. Yield: 907 mg.

The singlet of the acetyl group at 2.5 parts per million no longer appears in the nuclear magnetic resonance spectrum, which signifies that the acetyl groups have been completely removed. On the other hand, neither glycine nor ornithine could be detected by paper-chromatography in the reaction product. Accordingly, the peptide bonds have remained substantially intact.

Example 3

A solution of 377 mg. of partial hydrolysate prepared as described in Example 2 and 5 ml. of butyric anhydride in 8 ml. of pyridine is kept for 20 hours. The reaction mixture is then evaporated under vacuum and the excess anhydride is substantially expelled under vacuum. The residue is dissolved in about 70 ml. of methanol which has been saturated with ammonia at 0° C. After 6 hours the solution is evaporated under vacuum and freed from ammonia.

The residue is dissolved in 30 ml. of methanol and 0.5 gram of ferric chloride in 10 ml. of methanol is added. The mixture turns immediately deep violet. The solution is buffered by adding some crystalline sodium acetate, whereupon the color shifts to orange-brown. After standing for 1 hour, the batch is evaporated under vacuum, the residue is dissolved in water and repeatedly agitated with n-butanol, whereby the dyestuff is substantially transferred to the organic phase.

The butanol extracts are washed three times with water and then evaporated. The residue is dissolved in methanol, a small amount of insoluble matter is filtered off, and the filtrate is evaporated and the residue recrystallized from methanol+ether, to yield 250 mg. of red-brown crystal needles which decompose at about 250° C., without first melting.

| $C_{33}H_{54}O_{12}N_9Fe$ | C | H | N | Fe, Percent |
|---|---|---|---|---|
| Calculated | 48.06 | 6.60 | 15.28 | 6.77 |
| Found | 47.49 | 6.66 | 14.97 | 7.48 |

$\lambda_{max}$ in water: 430 m$\mu$; log $\epsilon$ 3.45.
$\lambda_{max}$ in absolute alcohol: 428 m$\mu$; log $\epsilon$ 3.48.
Infra-red absorption spectrum in potassium bromide: see FIGURE 2.

Example 4

530 mg. of partial hydrolysate prepared as described in Example 2 are reacted with 5 ml. of propionic anhydride as described in Example 3. After ammonolysis of the reaction product the trihydroxamic acid is complexed in methanol with 0.5 gram of ferric chloride. The reaction product taken up in water can in this case be extracted with butanol only incompletely. Accordingly, the aqueous solution is agitated with a mixture of 1 part by weight of phenol and 1 part by volume of chloroform. A solution of the product in phenol-chloroform is cleared through a short Celite column, mixed with ether, and once more agitated with water. The aqueous solution is repeatedly washed with ether to remove the phenol completely, and then evaporated under vacuum. From the residue there is obtained the propionic acid derivative by recrystallization from methanol+ether in fine, felted needles of orange-yellow color.

| $C_{30}H_{48}O_{12}N_9Fe$ | C | H | N | Fe, Percent |
|---|---|---|---|---|
| Calculated | 46.06 | 6.18 | 16.11 | 7.14 |
| Found | 45.89 | 6.24 | 16.31 | 7.13 |

$\lambda_{max}$ in water: 430 m$\mu$; log $\epsilon$ 3.44.
$\lambda_{max}$ in absolute alcohol: 432 m$\mu$; log $\epsilon$ 3.42.
Infra-red absorption spectrum in potassium bromide: see FIGURE 1.

Example 5

When the partial hydrolysate prepared as described in Example 2 is reacted with acetic anhydride as described in Example 4, the resulting final product, after crystallization from methanol, forms orange-yellow needles that cannot be distinguished from ferrichrome by the infra-red absorption spectrum nor by the behavior in paper-chromatography nor by its biological action.

Example 6

Paper-chromatographic behavior of the ferrichrome homologues:

The paper-chromatographic examination is performed with the system n-butanol:glacial acetic acid:water in the volumetric ratio of 4:1:1. Ferrichrome and the two homologues obtained as described in Examples 3 and 4 have the following Rf values: Ferrichrome 0.27; propionic acid derivative 0.53; butyric acid derivative 0.72.

Example 7

300 mg. of crystalline ferrichrome A are dissolved in 100 ml. of water by strong heating on a boiling water bath. A solution of 300 mg. of 8-hydroxyquinoline in about 5 ml. of methanol is added, and the mixture is stirred for 24 hours at room temperature. The precipitated hydroxyquinoline-iron complex is filtered off, and the filtrate is agitated three times with chloroform to remove the excess reagent. The aqueous solution is evaporated to yield 206 mg. of ferrichrome A in the form of an amorphous, faintly brownish powder. It is iron-free.

Example 8

The crude iron-free ferrichrome A, obtained as described in Example 7, is dissolved in about 40 ml. of N-hydrochloric acid and heated for 80 minutes in a boiling water bath. At intervals of about 10 minutes a drop is taken out of the solution and mixed on a staining plate with a drop of ferric chloride solution. A violet color reaction indicates the presence of hydroxamic acids. After 80 minutes the ferric chloride reaction is much less strong than it was at the start. The solution contains the trihydroxylamine on which ferrichrome A is based.

Example 9

The partial hydrolysate obtained as described in Example 8 is evaporated under vacuum, and the residue is acetylated overnight with 5 ml. each of acetic anhydride and pyridine. The batch is once more evaporated, and the residue is mixed with 50 ml. of ammonia saturated in the cold with methanol and kept for 5 hours to eliminate the O-acetyl groups. The solution is then evaporated to dryness in vacuum.

The residue is dissolved in 10 ml. of methanol. On addition of a solution of 250 mg. of ferric chloride in 5 ml. of methanol, a deep violet coloration appears spontaneously which turns to red-brown when a small amount of crystalline sodium acetate is added. The solution is once more evaporated and the residue subjected to fractionation over 100 stages in a Craig apparatus. Solvent mixture: n-butanol+benzyl alcohol+0.001 N-hydrochloric acid+saturated aqueous sodium chloride solution 18:18:30:10.

The bulk of the brown dyestuff is found in fractions 1 to 20 and is non-unitary. In addition a distribution maximum forms in stage 41 (K=0.7) which belongs to a unitary compound. The behavior of this latter compound is identical with that of authentic ferrichrysin and is quite different from that of ferrichrome A.

Fractions 31 to 53 are combined. On addition of ether, the sideramine passes into the aqueous phase; it is isolated and the organic phase is further agitated twice with small amounts of water, whereupon all the dyestuff passes into the water.

The aqueous extracts are semi-saturated with sodium chloride and extracted with phenol+chloroform (1 g.:1 ml.). After dilution with ether the sideramine is again transferred into water and the aqueous solution is thoroughly washed with ether and evaporated in vacuum, to yield 11 mg. of an orange-brown powder. As revealed by the paper-chromatographic behavior in two solvent systems, the product is unitary and identical with ferrichrysin (see table). The product is just as biologically active as ferrichrysin in the antagonism test with ferrimycin A.

Paper-chromatographic behavior

System A: n-butanol+glacial acetic acid+water 4:1:1.
System B: tertiary butanol+0.004 N-hydrochloric acid+saturated aqueous sodium chloride solution 2:1:1; paper impregnated with acetone+water+saturated aqueous sodium chloride solution 6:3:1.

The sideramine spots are identified by their own, very strong orange-brown color.

|  | Rf system A | Rf system B |
| --- | --- | --- |
| Ferrichrome | 0.28 | 0.28 |
| Ferrichrome A | 0.25 | 0.32 |
| Ferrichrysin, authentic | 0.31 | 0.33 |
| Conversion product from ferrichrome A | 0.31 | 0.33 |

The absolute Rf values (more especially in system B) may vary considerably from case to case, whereas the relative speeds of migration of the different siderochromes are rather constant.

What is claimed is:

1. A process for the manufacture of trihydroxylamines, and the acid addition salts formed with mineral acids, wherein a member selected from the group consisting of iron-free ferrichrome and iron-free ferrichrome A is submitted to hydrolysis by means of a dilute mineral acid until the violet coloration with ferric chloride is no longer produced.

2. Process according to claim 1, wherein the resulting desacyl compound is acylated.

3. Process according to claim 1, wherein the resulting desacyl compound is acylated to the O,N-diacyl derivative and the latter partially hydrolyzed with a basic agent to the N-acyl derivative.

4. Process according to claim 3, wherein an alkali metal hydroxide in a lower alkanol is used as basic agent.

5. Process as claimed in claim 3, wherein ammonia in a lower alkanol is used as basic agent.

6. Process according to claim 1, wherein the desacyl compound is acylated with a lower alkanoic acid anhydride.

7. Process according to claim 1, wherein the desacyl compound is acylated with propionic acid anhydride.

8. Process according to claim 1, wherein the desacyl compound is acylated with butyric acid anhydride.

9. A member selected from the group consisting of the tri-N-hydroxylamine derived from iron-free ferrichrome of the formula cyclo-[(glycyl)$_3$, (N$\delta$-hydroxyornithyl)$_3$] and its acid addition salts.

10. Tri-(O,N-diacyl) derivatives of the trihydroxylamines claimed in claim 9, wherein the acyl radical is derived from a carboxylic acid having 1–6 carbon atoms.

11. Tri-(O,N-di-lower alkanoyl) derivatives of the compounds claimed in claim 9.

12. Tri-(N-acyl) derivatives of the trihydroxylamines claimed in claim 9, wherein the acyl radical is derived from a carboxylic acid having 3–6 carbon atoms.

13. Tri-(N-acyl) derivatives of the trihydroxylamines claimed in claim 9, wherein the acyl radical is a member selected from the group consisting of propionyl and butyryl.

14. A member selected from the group consisting of the tri-N-hydroxylamine derived from iron-free ferrichrome A of the formula cyclo [(seryl)$_2$, glycyl, (N$\delta$-hydroxyornithyl)$_3$] and its acid addition salts.

15. Tri-(O,N-diacyl) derivatives of the trihydroxylamines claimed in claim 14, wherein the acyl radical is derived from a carboxylic acid having 1–6 carbon atoms.

16. Tri-(O,N-di-lower alkanoyl) derivatives of the trihydroxylamines claimed in claim 14.

17. Iron complex salts of the trihydroxamic acids claimed in claim 12.

18. Iron complex salts of the trihydroxamic acids claimed in claim 13.

References Cited

Emery et at., American Chemical Society Journal, vol. 83, 1961, pp. 1626–1628.

Neilands, Experientia Supplement 2, 222–232 (1964).

LEWIS GOTTS, *Primary Examiner.*

PERRY A. STITH, *Examiner.*

M. M. KASENOFF, *Assistant Examiner.*